(12) United States Patent
Curbera et al.

(10) Patent No.: US 9,171,283 B2
(45) Date of Patent: Oct. 27, 2015

(54) CAPTURING AND VISUALIZING DATA LINEAGE IN CONTENT MANAGEMENT SYSTEM

(75) Inventors: Francisco P. Curbera, Hastings on Hudson, NY (US); Yurdaer N. Doganata, Chestnut Ridge, NY (US); Axel Martens, White Plains, NY (US); Huong T. Morris, Los Gatos, CA (US); Nirmal K. Mukhi, Lake Grove, NY (US); Aleksander A. Slominski, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 13/004,546

(22) Filed: Jan. 11, 2011

(65) Prior Publication Data

US 2012/0179990 A1     Jul. 12, 2012

(51) Int. Cl.
- G06F 3/048 (2013.01)
- G06Q 10/10 (2012.01)
- G06F 17/30 (2006.01)

(52) U.S. Cl.
CPC .......... *G06Q 10/10* (2013.01); *G06F 17/30312* (2013.01)

(58) Field of Classification Search
CPC .............. G06F 17/30011; G06F 17/24; G06F 17/30312; G06F 17/30309; G06F 17/30893; G06F 17/3023; G06F 17/3028
USPC ................................. 706/47; 715/771; 726/30
See application file for complete search history.

(56) References Cited

U.S. PATENT DOCUMENTS

| | | | |
|---|---|---|---|
| 7,493,570 B2 | 2/2009 | Bobbin et al. | |
| 7,496,588 B2 | 2/2009 | Wong et al. | |
| 2009/0063534 A1 | 3/2009 | Halberstadt | |
| 2009/0182780 A1* | 7/2009 | Wong et al. | 707/200 |
| 2009/0327347 A1* | 12/2009 | Hoang et al. | 707/104.1 |
| 2010/0114627 A1 | 5/2010 | Adler et al. | |
| 2010/0138420 A1 | 6/2010 | Bator et al. | |

OTHER PUBLICATIONS

B. Shelstad et al., "Object Role Modeling Enabled Metadata Repository," On the Move to Meaningful Internet Systems 2007: OTM 2007 Workshops, Lecture Notes in Computer Science, 2007, pp. 634-646, vol. 4805.

Gary Decker, "Master Data Management and Governance," SAP, Mar. 2010.

A. White et al., "Mastering Master Data Management," Gartner, Inc., ID No. G00136958, Jan. 2006, pp. 1-6.

"Master Data Management—An Oracle White Paper," Oracle, Jun. 2009, 45 pages.

* cited by examiner

*Primary Examiner* — Amy Ng
*Assistant Examiner* — Andres E Gutierrez
(74) *Attorney, Agent, or Firm* — Nidhi Garg; Ryan, Mason & Lewis, LLP

(57) ABSTRACT

Techniques are disclosed for capturing and visualizing data lineage in content management systems. For example, a method comprises the following steps. A plurality of data sets is received. Each of the data sets is associated with a party and comprises a plurality of information. A set of lineage data about one or more of the data sets is received. The lineage data comprises information about the history of a particular data set. A user interface is presented that conveys a representation of one or more of the plurality of received data sets and at least a portion of the lineage data about the history of one or more of the data sets. A command is received at the user interface to merge or unmerge two data sets in the plurality of data sets. Two or more data sets in the plurality of data sets are merged or unmerged based on the received command.

15 Claims, 7 Drawing Sheets

CAPTURING AND VISUALIZING DATA LINEAGE IN CONTENT MANAGEMENT SYSTEM

FIELD OF THE INVENTION

The present invention relates to content management systems and, more particularly, to techniques for capturing and visualizing data lineage in such systems.

BACKGROUND OF THE INVENTION

A content management system is, generally speaking, a system that allows users to manage content. Content can be in any form including, but not limited to, electronic data representing documents, videos, images, names, phone numbers, addresses, records, application-specific data (e.g., scientific data), etc. The content management system typically comprises one or more computer-executable software application programs that implement procedures for managing the electronic data.

One example environment for a content management system is a company where multiple users store and access electronic company data in a collaborative manner. In such an environment, the content management system controls, for example, storage, retrieval, publishing, viewing and editing of the electronic data associated with the company. Many challenges can exist, however, in implementing the data management procedures of a company.

SUMMARY OF THE INVENTION

Illustrative embodiments of the invention provide techniques for capturing and visualizing data lineage in content management systems. While techniques of the invention are particularly well-suited to content management environments that comprise a master content management system and a master data management system, it is to be appreciated that techniques of the invention can be applied to other content management systems.

For example, in one aspect of the invention, a method comprises the following steps. A plurality of data sets is received. Each of the data sets is associated with a party and comprises a plurality of information. A set of lineage data about one or more of the data sets is received. The lineage data comprises information about the history of a particular data set. A user interface is presented that conveys a representation of one or more of the plurality of received data sets and at least a portion of the lineage data about the history of one or more of the data sets. A command is received at the user interface to merge or unmerge two data sets in the plurality of data sets. Two or more data sets in the plurality of data sets are merged or unmerged based on the received command.

In a second aspect of the invention, a computer system comprises at least one local content manager component for managing one or more data sets associated with one or more parties, and a first data log for storing information associated with one or more of the creation, replacement, updating and deletion of the one or more data sets. The system comprises a local party identifier assignment component for assigning one or more local party identifiers to the one or more data sets, and a second data log for storing the one or more local party identifiers. The system also comprises a master data management component for assigning one or more master party identifiers to the one or more local party identifiers, and a third data log for storing the one or more master party identifiers. Further, the system comprises a log correlator component for correlating at least a portion of the data stored in the first data log, the second data log and the third data log. Still further, the system comprises a visualizer component for displaying at least a portion of the data associated with the components and logs. The computer system also comprises a memory and at least one processor device for implementing the components and the logs.

Advantageously, illustrative embodiments of the invention provide correlation of information stored in the logs, which thus gives the lineage of the master identifier creation process. The lineage information may then be displayed by using a visualizer (e.g., user interface) to show which data set (e.g., document) is linked to what party identifier and how linkages are affected by CRUD (creation, replacement, updating and deletion) events. The visualizer may also help a user to realize the cause/effect relations between document CRUD events and party identifier association. The visualizer may also display information about when the documents are created/updated/deleted and which agent performed the CRUD event. The user may then collapse and split party identifiers by using the visualizer which enables the user to preview the results and its impact before a collapse and a split occurs.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
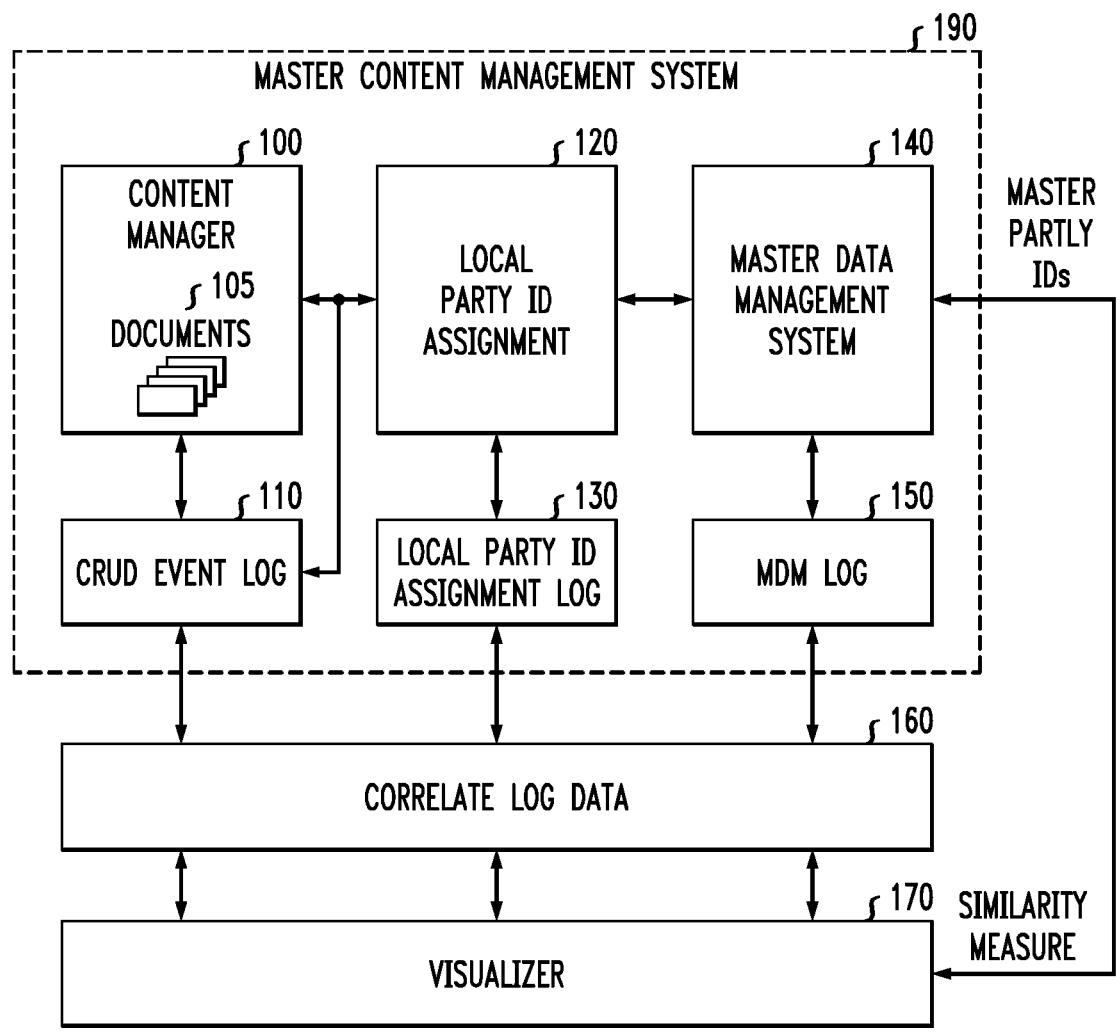
FIG. 1 illustrates a system for capturing and visualizing data lineage in a content management system, according to an embodiment of the invention.

It to be appreciated that, while illustrative embodiments of the invention will be described herein in the context of a master content management system (MCMS) and a master data management system (MDMS), principles of the invention may be more generally applicable to other data processing environments. Nonetheless, principles of the invention are particularly well-suited for use in MCMS/MDMS environments that are implemented by one or more enterprises. One example of a content management system having MCMS/MDMS components in which principles of the invention may be implemented is the InfoSphere™ information management system available from IBM Corporation (Armonk, N.Y.). However, principles of the invention may be implemented in other content management systems.

As used herein, the term "enterprise" is understood to broadly refer to any entity that is created or formed to achieve some purpose, examples of which include, but are not limited to, an undertaking, an endeavor, a venture, a business, a concern, a corporation, a company, an establishment, a firm, an organization, or the like.

In general, an MCMS manages electronic data that is storable on and retrievable by one or more computer systems. The MCMS typically bridges one or more content managers to an MDMS. The MDMS functions to, among other things, manage identification information across documents of the one or more content managers. It is to be understood that each content manager may be dedicated to a distinct domain in the entity. Thus, the MCMS/MDMS comprise computer-executable software application programs (applications) that help enterprises control enterprise-related data by enabling them to manage and maintain a complete and accurate view of their master data. "Master data" refers to the set of data that an enterprise maintains as and considers their most accurate data, i.e., an original or master data set. It is therefore critical to maintain the integrity of the master data of an enterprise.

In an MCMS, documents that belong to a "party" (i.e., person, product, company, etc.) are linked to a party identifier (id) based on meta-data associated with each document. "Meta-data" is generally understood to be data about data. The meta-data that is illustratively used here describes various aspects of the information related to a party such as, for example, Name, Date of Birth, Social Security Number, and Address. As an example, "Peter Cooper" could be a person's name or a street address. The meta-data associated with the label "Peter Cooper" helps the disambiguation.

As a result of this linking, the documents that belong to the same party id are grouped together. Note that, in the illustrative descriptions herein, the terms "document" or "documents" are used in place of the more general terms "content" or "data." However, the illustrative embodiments described herein are not intended to be limited to data that is just in the form of documents, but can be more generally applicable to all kinds of data (e.g., videos, images, records, databases, etc.)

The process of creating meta-data for documents, however, is not perfect. As a result, mismatches occur between party ids and the associated documents. If documents that belong to the same party have different meta-data (such as a party may have multiple addresses), multiple party ids are created for the same party. These are called duplicate ids and they should be merged. Similarly, if a document is linked to a wrong id, it should be split.

The MCMS bridges one or more content managers to the MDMS. The documents that are stored in a content manager are linked to a party id. These are called local party ids and they are sent to the master data management system to identify suspect duplicates. MDMS creates master ids from local party ids initially created for each document. The problem of identifying suspect duplicates is currently solved by using a matching algorithm between two party ids within the master data management system. If the match is strong enough, two party ids are collapsed (merged) into one party id. This is done automatically or manually by a data steward that decides which meta-data survives. A "data steward" may be a person or an application program (or some combination thereof). Besides creating duplicate party information, linking a document to a wrong party id is another problem created by a mismatch. Similarly, based on the new information received, the data steward may decide to split a party id, if there are enough differences, and create two separate ids. However, it is realized that data stewards may not always correctly decide which data elements should survive during the collapse or split actions.

FIG. 1 shows a system that integrates a visualizer with a master content management system (MCMS) in accordance with one embodiment of the invention. As explained above, the MCMS bridges one or more content managers to a master data management system (MSDS). One content manager is shown in FIG. 1 for ease of illustration, however, it is to be understood that more than one content manager may be part of the system.

As shown, one or more documents 105 are scanned (e.g., via an optical image/character scanner, not shown) and stored in a content manager component 100. Events related to document creation, replacement, update and deletion (CRUD events) are collected in CRUD Event Log 110.

When a document is created, a Local Party ID is assigned to the document based on the document meta-data which comprises entities related to a party such as 'Name,' 'Date of Birth,' 'Address,' 'Social Security Number,' 'Address,' 'Telephone Number,' etc. This assignment is performed by Local Party ID (LID) Assignment component 120. A CRUD event invokes the LID assignment. If the meta-data is matched with an existing LID, then no new LID is created. Otherwise, a new LID is created for each new document.

LID assignment operations are captured by Local Party ID Assignment Log 130. Local Party IDs that are associated with documents are sent to Master Data Management System (MDMS) 140 for further processing. MDMS 140 creates Master Data Management Part IDs (MDMPID) by identifying and collapsing (merging) duplicate LIDs or by splitting LIDs that are collapsed erroneously. The collapse and split actions are either done automatically or manually (e.g., by a data steward). The MDMIDs are stored in MDM Log 150.

All log data (from logs 110, 130 and 150) is correlated in a log data correlation component 160 and sent to a visualizer component 170 to visualize the history of assigning a master party id to the documents 105 in the content manager 100.

Accordingly, illustrative principles of the invention are based on collecting, correlating and visualizing three independent log data sets. The first is the log 110 of CRUD (create/replace/update/delete) events of the content manager 100, the second is the history log 130 of associating documents 105 to local party ids, and the third is the history log 150 of a master data management system 140 that manages the master party ids.

Advantageously, correlating the information stored in the log files gives the lineage of master id creation. This is accomplished by log data correlator 160. The lineage information is then displayed by using a visualizer 170 to show which document is linked to what party id and how linkages are affected by CRUD events. The visualizer 170 helps the data steward to realize the cause/effect relations between document CRUD events and party id association. Visualizer 170 also displays information about when the documents are created/update/deleted and which agent performed the CRUD event. The data steward can then collapse and split party ids by using the visualizer 170 which enables the data steward to preview the results and its impact before a collapse and a split occurs. Without the lineage information and visualizer, the data steward does not have any tool to decide which data elements survive.

In one embodiment, the visualizer 170 comprises a graphical user interface (GUI) that visually displays the data lineage and information mentioned above, and allows the data steward (a person in the case of a GUI embodiment) to perform the collapse and split operations.

Figure 2:
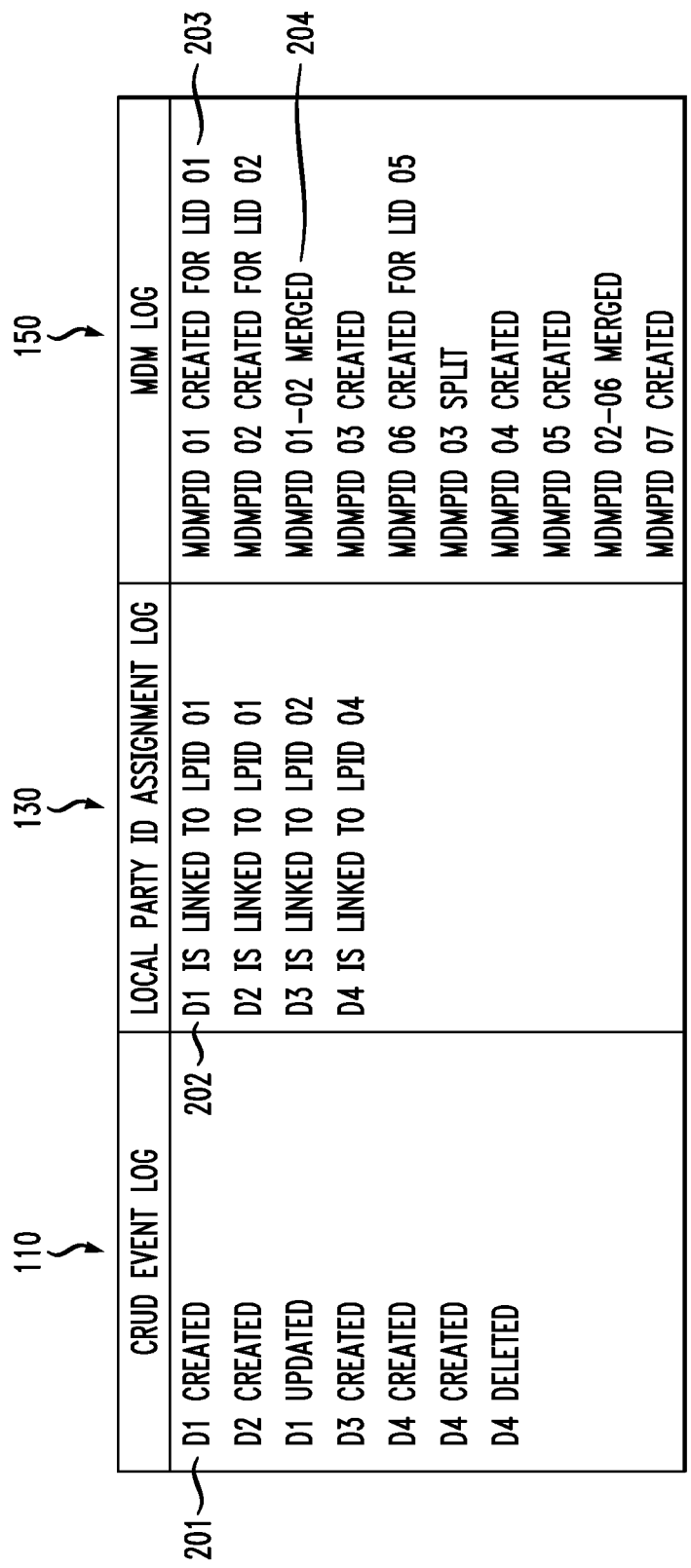
FIG. 2 illustrates content of log files correlated and utilized for a visualizer, according to an embodiment of the invention.

Data is visualized by correlating the data registered in the three log files (110, 130 and 150). Sample content of the three log files is shown in FIG. 2. For example, an entry 201 is stored in log 110 when document D1 is created. An entry 202 is stored in log 130 when Local Party ID LPID 01 is linked to D1. An entry 203 is stored in log 150 when Master Data Management ID MDMPID 01 is created for LID 01. Assuming, a merging of MDMPID 01 and an MDMPID 02, an entry 204 is stored in log 150. It is also to be understood that entries in each log 110, 130 and 150 have time stamps, thus, the time of occurrence of each entry is recorded in the corresponding log as well. As the data is read from the logs, associated icons are rendered on the visualizer (GUI) as will be further explained below in the context of FIGS. 4 and 5.

Figure 3:
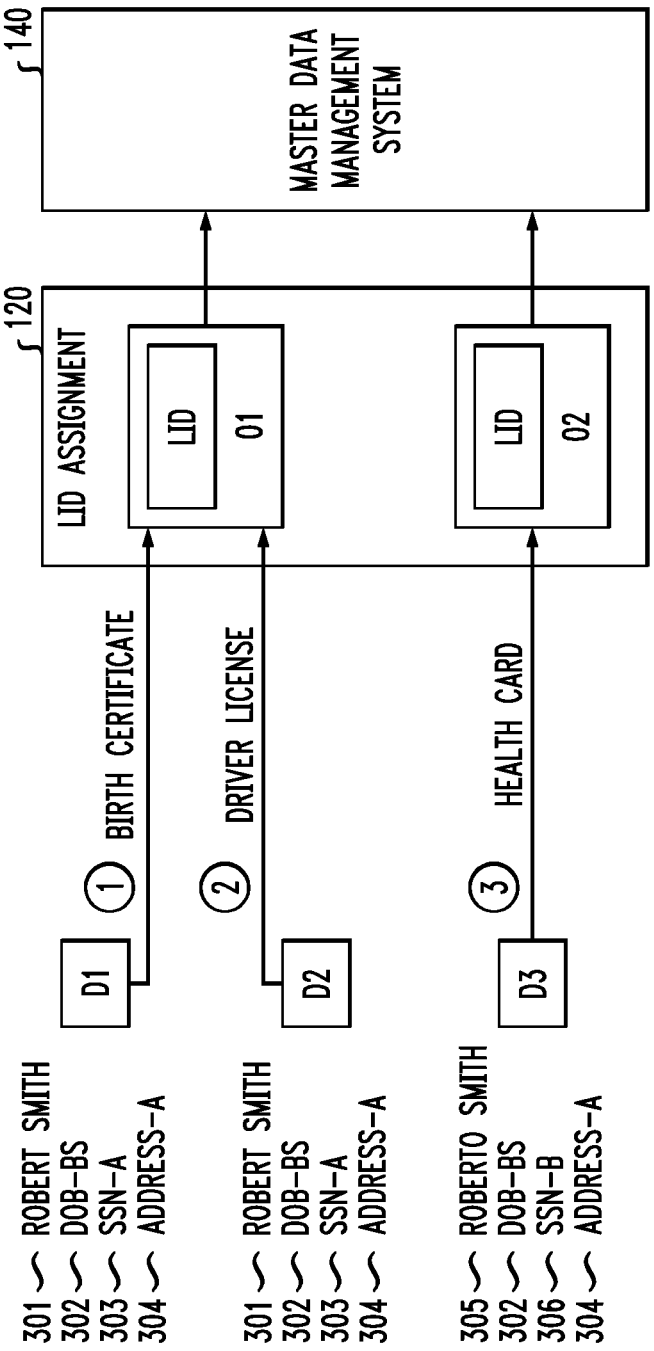
FIG. 3 illustrates a process for associating local identifiers to documents, according to an embodiment of the invention.

FIG. 3 shows the Local Party ID assignment component 120. In the example, depicted, documents D1 which is a birth certificate and D2 which is a driver's license are linked to local party id (LID) 01 based on the documents having matching meta-data which includes a first and last name 301 (Robert Smith), a date of birth 302 (DOB-BS), a social security number 303 (SSN-A) and an address 304 (Address-A). The reason why Document D3 is linked to another local party id (LID) 02 is that the name 301 and the social security number 303 of D1 and D2 are different than the name 305 (Roberto instead of Robert) and the social security number 306 (SSN-B instead of SSN-A) of D3.

The documents that have the same critical data (in the example above, D1 and D2) are grouped together and assigned the same local party ID. Each local ID represents a group of documents that are assumed to belong to the same party. In this example, a birth certificate and a driver license that belongs to Robert Smith are linked to local party ID 01. Once LIDs are created, then they are sent to the MDMS 140 for further processing to identify suspect duplicates.

Figure 4:
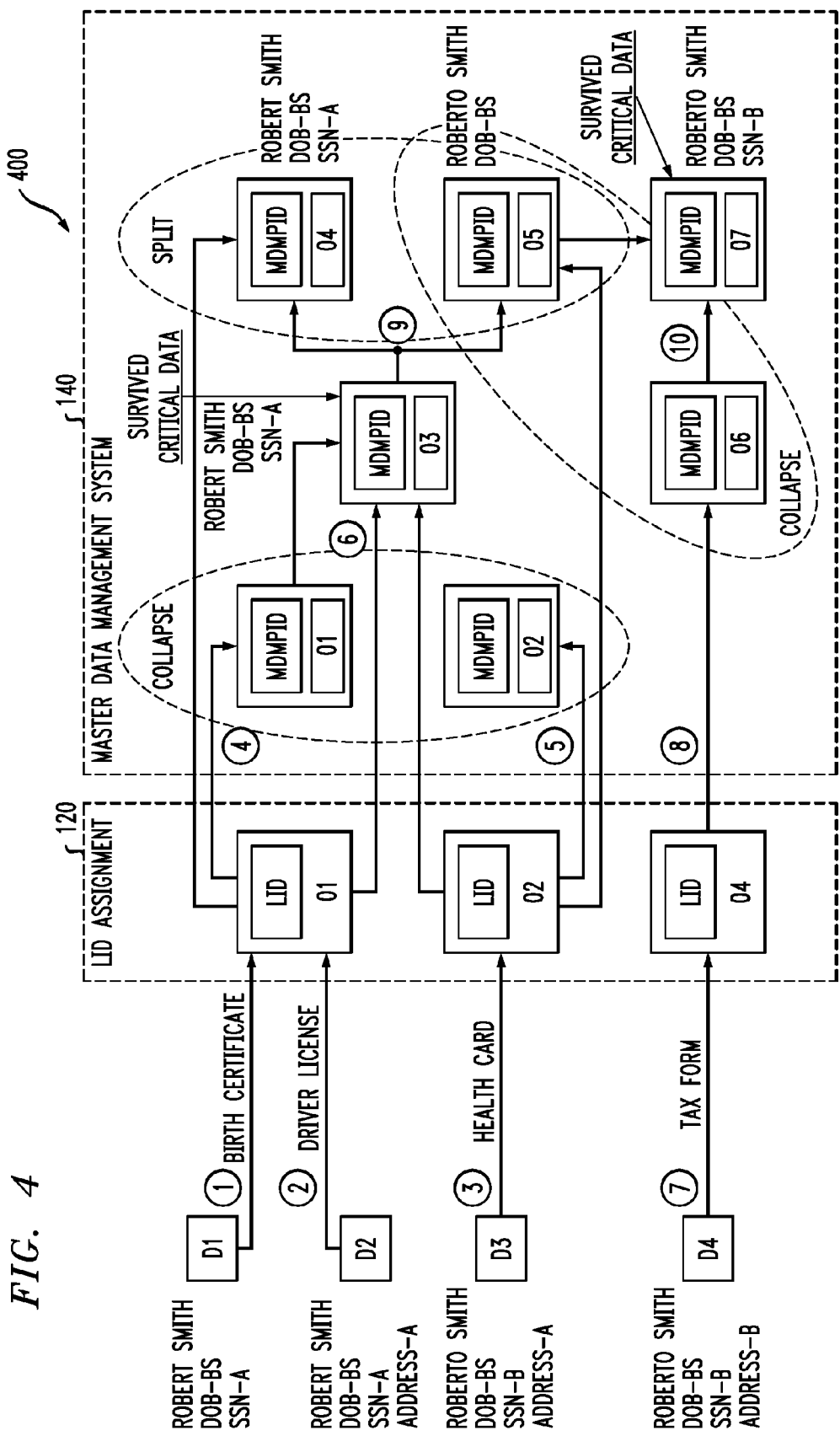
FIG. 4 illustrates a process for visualization of master party identifier creation, according to an embodiment of the invention.

FIG. 4 is an example of a GUI 400 that visualizes the steps of linking documents to local party ids and creating associated master party ids within the MDMS 140.

Steps 1, 2 and 3 represent the assignment of local party ids to documents D1, D2 and D3 (D1 and D2 to LID 01, and D3 to LID 02). Steps 4 and 5 represent the assignment of master party ids to LID 01 (MDMPID 01) and LID 02 (MDMPID 02).

Thus, MDMS 140 assigns a master party ID (MDMPID) for every local ID before suspect duplicates are determined. Hence, MDMPIDs 01 and 02 are created for local party IDs 01 and 02 respectively by the MDMS 140. Note that different LIDs may belong to the same party due to erroneous meta-information.

In the example depicted in FIG. 4, it is assumed that data steward collapses party IDs 01 and 02 at step 6 creating MDMPID 03. Although the critical data of LID 02 which is "Roberto" does not match with that of LID 01 which is "Robert," data steward suspects a typographical error (typo) in the health card and decides to collapse the LIDs 01 and 02 to form MDMPID 03. The meta-information associated with MDMPID 03 is called the "survived critical data." As a result of this collapse, critical data "Robert" survives and "Roberto" is eliminated.

Then at step 7, D4, a tax form, is scanned and assigned LID 04. In step 8, a MDMPID 06 is assigned to LID 04. This time, in step 9, the data steward decides to split what was collapsed before, because she decides that Roberto is a separate individual different than Robert and there is no typo. Thus, MDMPID 03 is split into MDMPID 04 and MDMPID 05.

Note that the data steward who collapsed MDMPID 01 and 02 and the one who split MDMPID 03 do not have to be the same person. The lineage visualizer (GUI 400) helps the steward to see at what stage a collapse or a split occurred and what invoked the decision. That is, the data steward sees what is depicted in FIG. 4 on the display of the computer system she is using to visualize the data.

Thus, at step 9, as a result of a split, MDMPIDs 04 and 05 are created which belong to Robert Smith and Roberto Smith respectively. At step 10, the data steward then realizes that MDMPIDs 05 and 06 are duplicates and decides to perform a collapse which results in creating MDMPID 07.

In addition to showing the history of actions taken over MDMPIDs, the visualizer according to an embodiment of the invention also shows similarity between two MDMPIDs. Various known similarity measures can be employed to determine similarity between two party ids based on their meta-data. The degree of similarity between two records depends on which meta-data values of these records are the same. As an example, consider two records with the same Name, SSN and Date of Birth but different addresses. It is very likely that these two records belong to the same person who resided in two different addresses. If the records have different SSN but the same address, it would be less likely that these records belong to the same person. One way of measuring similarity is to give weight to the comparison of each meta-data value. For every match, the value of similarity measure is increased, and for each mismatch, it is decreased. As an example, if the name values are the same for each record, 10 points is added, if not 10 points is subtracted. If the SSN of each record is the same, however, 40 points is added, if not 40 points is subtracted. This way the impact of each meta-data value on the similarity measure is adjusted. The similarity measure is also called the distance between two records. The distance is zero when two records are an exact match. The less the distance between two records, the more similar are the two records. MDMS 140 implements one or more of these known similarity measures to decide on merges and splits, although principles of the invention are not intended to be limited to any particular similarity measure.

Figure 5:
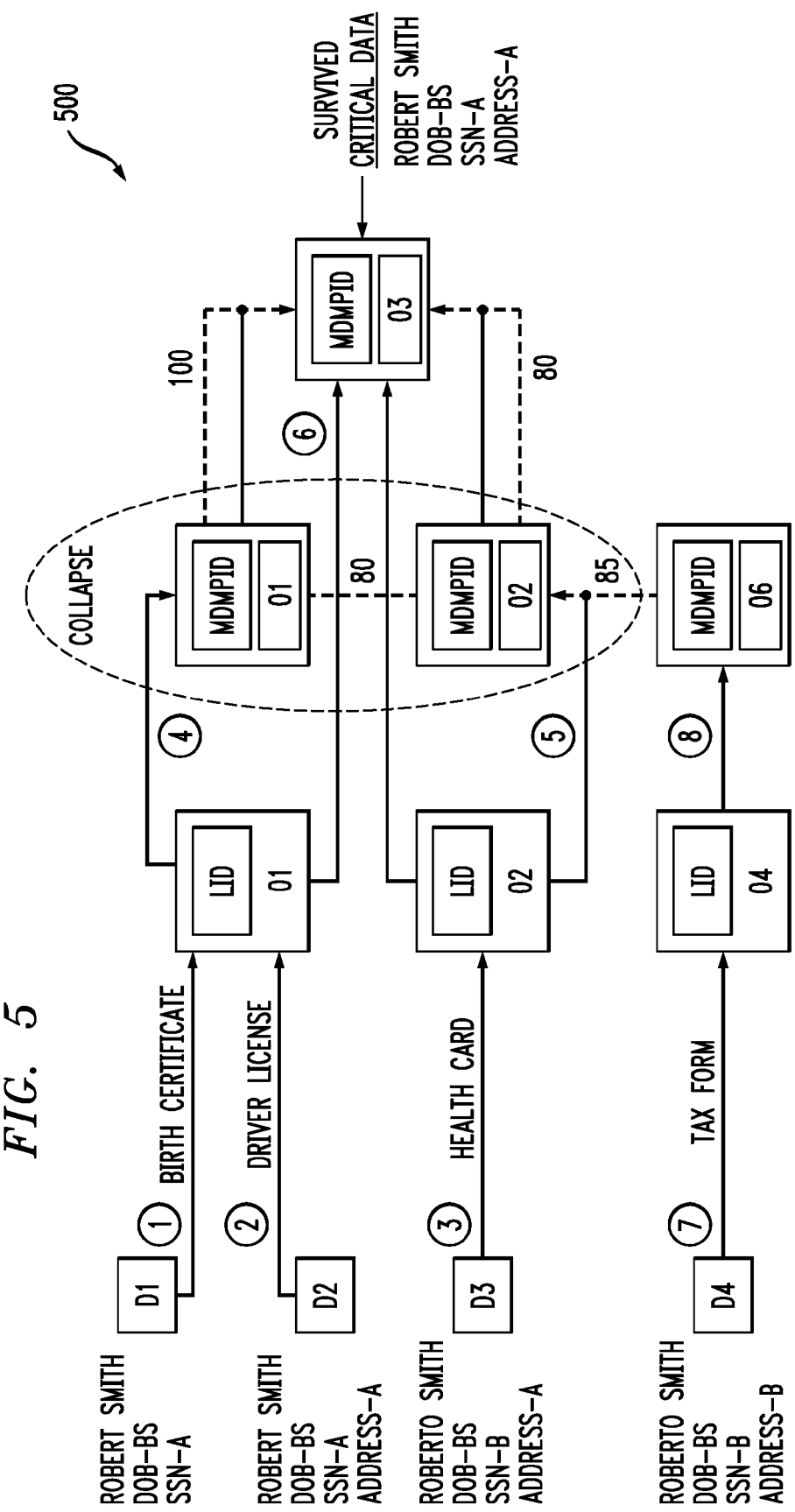
FIG. 5 illustrates a process for displaying similarity levels between party identifiers, according to an embodiment of the invention.

FIG. 5 depicts another aspect of the visualizer where similarity measure is displayed between every pair of MDMPIDs. In the example depicted by FIG. 5, i.e., GUI 500, the level of similarity between MDMPID 01 and 02 is calculated by the MDMS 140 as a value of 80. If the value of the measure is above a certain threshold, then it is assumed that ids are duplicates and they are collapsed. Here, it is assumed that the similarity measure 80 is above the threshold and a collapse is warranted. After the collapse is completed, the level of similarity between the new id MDMPID 03 and the old ids MDMPID 01 and 02 are calculated and displayed as well, e.g., values of 100 and 80, respectively.

After the document D4 is introduced, however, the visualizer (GUI 500) shows that MDMPID 06 is more similar to MDMPID 02 then MDMPID 01, i.e., a value of 85 rather than the value of 80. This creates an alert to the data steward to suggest that the prior collapse was not accurate and it would have been better to collapse MDMPID 02 and MDMPID 06. Thus, the data steward splits what was collapsed and merges MDMPID 06 with MDMPID 02 creating a new MDMPID (e.g., MDMPID 07 as shown in FIG. 4).

Figure 6:
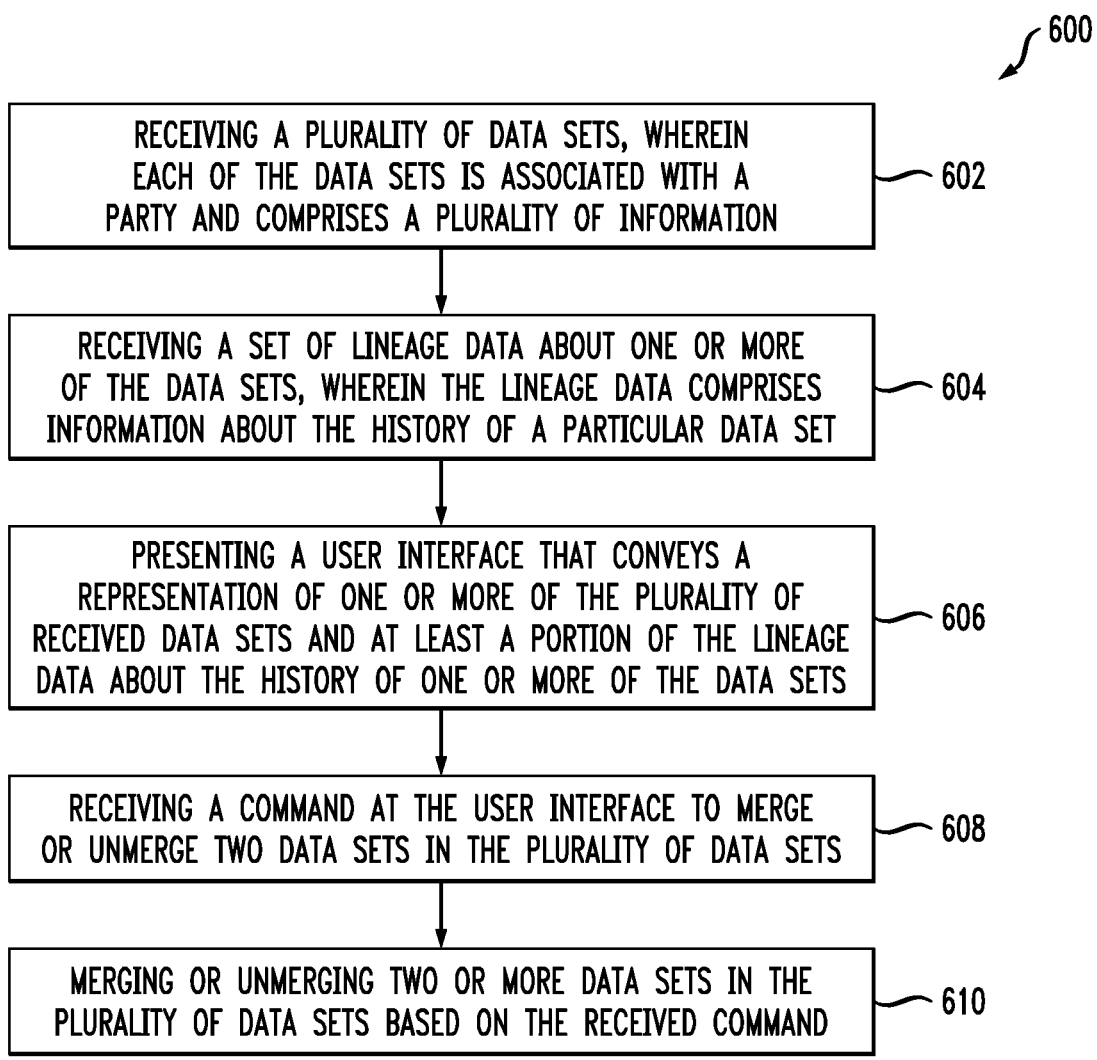
FIG. 6 illustrates a methodology for capturing and visualizing data lineage in a content management system, according to an embodiment of the invention.

FIG. 6 illustrates a methodology for capturing and visualizing data lineage in a content management system, according to an embodiment of the invention. It is to be understood that the methodology 600 of FIG. 6 may be implemented in the content management system environment of FIG. 1.

As shown, a plurality of data sets is received in step 602. The "data sets" may be the documents referred to above, in one example. Each of the data sets is associated with a party (i.e., person, product, company, etc.) and comprises a plurality of information. Thus, in the case of the data set being a birth certificate document, the dataset may comprise a name, a date of birth, a social security number, an address, among other information.

A set of lineage data about one or more of the data sets is received in step 604. The lineage data comprises information about the history of a particular data set. This may comprise information about CRUD events, and assignments of local and master party identifiers.

A user interface is presented in step 606 that conveys a representation of one or more of the plurality of received data sets and at least a portion of the lineage data about the history of one or more of the data sets. Examples of such a representation are described above and shown in FIGS. 4 and 5.

In step 608, a command is received at the user interface to merge (e.g., collapse) or unmerge (e.g., split) two data sets in the plurality of data sets. This may also include merging and unmerging identifiers. The command can be received in a variety of typical ways, e.g., a data steward may use his/her mouse (or other pointing device) to draw a circle or box around ("rubber banding") the elements in the interface that he/she would like merged, and/or the data steward may click on elements to be unmerged or merged. Further, the user interface may have one or more data entry fields and/or pull down menus for entering a command. Principles of the invention are not intended to be limited to any particular user interface data entry techniques.

In step 610, two or more data sets in the plurality of data sets are merged or unmerged based on the received command.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1-6, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-6, can also include, as described herein, providing a system, wherein the system includes distinct modules (e.g., modules comprising software, hardware or software and hardware). By way of example only, the modules may include, but are not limited to, a content manager module, a CRUD event log module, a local party id assignment module, a local party id assignment log module, a master data management system module, a master data management log module, a log data correlation module and a visualizer module. These and other modules may be configured, for example, to perform the steps described and illustrated in the context of FIGS. 1-6.

Figure 7:
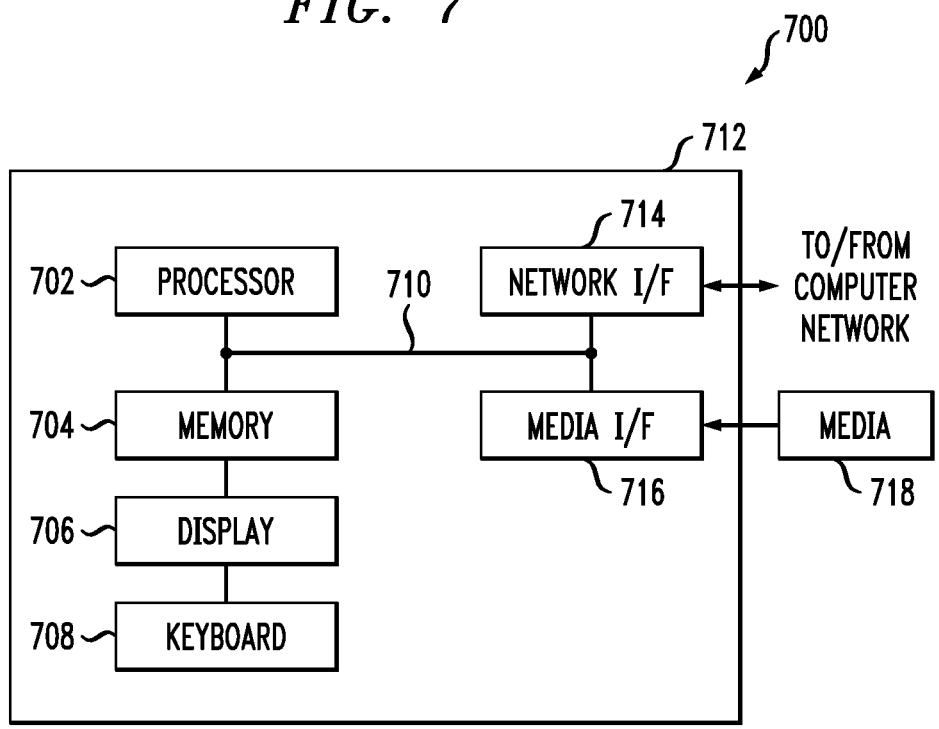
FIG. 7 illustrates a computer system in accordance with which one or more components/steps of the techniques of the invention may be implemented, according to an embodiment of the invention.

One or more embodiments can make use of software running on a general purpose computer or workstation. With reference to FIG. 7, such an implementation 700 employs, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. The processing device is preferably capable of processing video files. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer).

The processor 702, memory 704, and input/output interface such as display 706 and keyboard 708 can be interconnected, for example, via bus 710 as part of a data processing unit 712. Suitable interconnections, for example, via bus 710, can also be provided to a network interface 714, such as a network card, which can be provided to interface with a computer network, and to a media interface 716, such as a diskette or CD-ROM drive, which can be provided to interface with media 718.

A data processing system suitable for storing and/or executing program code can include at least one processor 702 coupled directly or indirectly to memory elements 704 through a system bus 710. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 708 for making data entries; display 706 for viewing provenance graph and data; pointing device for selecting data; and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, a "server" includes a physical data processing system (for example, system 712 as shown in FIG. 7) running a server program. It will be understood that such a physical server may or may not include a display and keyboard.

That is, it is to be understood that the components shown in FIG. 1 may be implemented on one server or on more than one server.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
    receiving a plurality of data sets, wherein each of the data sets is associated with a party and comprises a plurality of information;
    generating a set of lineage data about one or more of the data sets by collecting and correlating data stored in a plurality of data logs, wherein the plurality of data logs comprise at least one log of creation, replacement, updating, and deletion events, at least one history log of assignments of local identifiers to the one or more of the data sets based on meta-data of the one or more of the data sets, and at least one other history log of assignments of master identifiers to the one or more of the data sets, wherein a master data management system of a content management system assigns a master identifier to a particular data set by identifying and merging duplicate local identifiers or by splitting local identifiers that are merged erroneously;
    receiving the set of lineage data about the one or more of the data sets, wherein the lineage data comprises information about identifier assignment history and information about a creation, replacement, updating, and deletion of the particular data set;
    visualizing the plurality of data logs by presenting a user interface that conveys a representation of the one or more of the data sets and at least a portion of the lineage data about the identifier assignment history and the creation, replacement, updating, and deletion of the one or more of the data sets, wherein the representation of the lineage data is derived from the correlation, and wherein the user interface comprises a graphical user interface;

receiving a command at the user interface to merge or unmerge two data sets in the plurality of data sets; and merging or unmerging two or more data sets in the plurality of data sets based on the received command;

wherein the step of visualizing further comprises:

conveying whether two or more data sets have been merged and unmerged;

displaying at what stage the two or more data sets have been merged or unmerged and what invoked a decision to merge or unmerge the two or more data sets;

displaying linkages of the one or more of the data sets to the assignments of the local and the master identifiers, and how the linkages are affected by the creation, replacement, updating, and deletion of the one or more of the data sets; and displaying information about when the creation, replacement, updating, and deletion of the one or more of the data sets occurs, and which agent performed the creation, replacement, updating, and deletion of the one or more of the data sets.

2. The method of claim 1, wherein the step of merging and unmerging two data sets further comprises merging and unmerging local identifiers assigned to particular data sets.

3. The method of claim 1, wherein a local content manager component of the content management system assigns a local identifier to the particular data set.

4. The method of claim 1, wherein the step of visualizing further comprises conveying a similarity measure as computed between two data sets.

5. The method of claim 1, wherein the graphical user interface assists in obtaining the command to merge or unmerge the two data sets.

6. The method of claim 1, wherein the graphical user interface permits a user to preview results of merging or unmerging the two or more data sets prior to merging or unmerging the two or more data sets.

7. An article of manufacture comprising a non-transitory computer readable storage medium having tangibly embodied thereon computer readable program code which, when executed, causes a computer to:

receive a plurality of data sets, wherein each of the data sets is associated with a party and comprises a plurality of information;

generate a set of lineage data about one or more of the data sets by collecting and correlating data stored in a plurality of data logs, wherein the plurality of data logs comprises at least one log of creation, replacement updating, and deletion events, at least one history log of assignments of local identifiers to the one or more of the data sets based on meta-data of the one or more of the data sets, and at least on other history log of assignments of master identifiers to the one or more of the data sets, wherein a master data management system of a content management system assigns a master identifier to a particular data set by identifying and merging duplicate local identifiers or by splitting local identifiers that are merged erroneously;

receive the set of lineage data about the one or more of the data sets, wherein the lineage data comprises information about identifier assignment history and information about a creation, replacement, updating, and deletion of the particular data set;

present a visualization of the plurality of data logs through a user interface that conveys a representation of the one or more of the data sets and at least a portion of the lineage data about the identifier assignment history and the creation, replacement, updating, and deletion of the one or more of the data sets, wherein the representation of the lineage data is derived from the correlation, and wherein the user interface comprises a graphical user interface;

receive a command at the user interface to merge or unmerge two data sets in the plurality of data sets;

merge or unmerge two or more data sets in the plurality of data sets based on the received command;

wherein the step of presenting a visualization further comprises:

conveying whether two or more data sets have been merged and unmerged;

displaying at what stage the two or more data sets have been merged or unmerged and what invoked a decision to merge or unmerge the two or more data sets;

displaying linkages of the one or more of the data sets to the assignments of the local and the master identifiers, and how the linkages are affected by the creation, replacement, updating, and deletion of the one or more of the data sets;

displaying information about when the creation, replacement, updating, and deletion of the one or more of the data sets occurs, and which agent performed the creation, replacement, updating, and deletion of the one or more of the data sets.

8. The article of claim 7, wherein the step of merging and unmerging two data sets further comprises merging and unmerging local identifiers assigned to particular data sets.

9. The article of claim 7, wherein a local content manager component of the content management system assigns a local identifier to the particular data set.

10. The article of claim 7, wherein the step of presenting a visualization further comprises conveying a similarity measure as computed between two data sets.

11. The article of claim 7, wherein the graphical user interface assists in obtaining the command to merge or unmerge the two data sets.

12. Apparatus comprising:

a memory; and at least one processing device operatively coupled to the memory and configured to:

receive a plurality of data sets, wherein each of the data sets is associated with a party and comprises a plurality of information;

generate a set of lineage data about one or more of the data sets by collecting and correlating data stored in a plurality of data logs, wherein the plurality of data logs comprise at least one log of creation, replacement, updating, and deletion events, at least one history log of assignments of local identifiers to the one or more of the data sets based on meta-data of the one or more of the data sets, and at least one other history log of assignments of master identifiers to the one or more of the data sets, wherein a master data management system of a content management system assigns a master identifier to a particular data set by identifying and merging duplicate local identifiers or by splitting local identifiers that are merged erroneously;

receive the set of lineage data about the one or more of the data sets, wherein the lineage data comprises information about identifier assignment history and information about a creation, replacement, updating, and deletion of the particular data set;

present a visualization of the plurality of data logs through a user interface that conveys a representation of the one or more of the data sets and at least a portion of the lineage data about the identifier assignment history and the creation, replacement, updating, and deletion of the one or more of the data sets, wherein the representation of the lineage data is derived from the correlation, and wherein the user interface comprises a graphical user interface;

receive a command at the user interface to merge or unmerge two data sets in the plurality of data sets; and merge or unmerge two or more data sets in the plurality of data sets based on the received command;

wherein the step of presenting a visualization further comprises;

conveying whether two or more data sets have been merged and unmerged;

displaying at what stage the two or more data sets have been merged or unmerged and what invoked a decision to merge or unmerge the two or more data sets;

displaying linkages of the one or more of the data sets to the assignments of the local and the master identifiers, and how the linkages are affected by the creation, replacement, updating, and deletion of the one or more of the data sets; and displaying information about when the creation, replacement, updating, and deletion of the one or more of the data sets occurs, and which agent performed the creation, replacement, updating, and deletion of the one or more of the data sets.

13. A computer system comprising, at least one local content manager component for managing one or more data sets associated with one or more parties;

a first data log for storing information associated with one or more of the creation, replacement, updating and deletion of the one or more data sets;

a local party identifier assignment component for assigning one or more local party identifiers to the one or more data sets based on meta-data of the one or more data sets;

a second data log for storing the one or more local party identifiers;

a master data management component for assigning one or more master party identifiers to the one or more local party identifiers by identifying and merging duplicate local party identifiers or by splitting local party identifiers that are merged erroneously;

a third data log for storing the one or more master party identifiers;

a log correlator component for correlating at least a portion of the data stored in the first data log, the second data log and the third data log; and a visualizer component for displaying at least a portion of the data associated with the components and logs, wherein the visualizer component is configured to display lineage information generated as a result of the correlating of the data stored in the first, second and third data logs;

wherein the computer system further comprises a memory and at least one processor device for implementing the components and the logs;

wherein the visualizer component is configured to convey whether two or more data sets have been merged and unmerged;

wherein the visualizer component comprises a graphical user interface configured to:

display at what stage the two or more data sets have been merged or unmerged and what invoked a decision to merge or unmerge the two or more data sets;

display linkages of the one or more data sets to the assignments of the local and the master party identifiers, and how the linkages are affected by the creation, replacement, updating, and deletion of the one or more data sets; and display information about when the creation, replacement, updating, and deletion of the one or more of the data sets occurs, and which agent performed the creation, replacement, updating, and deletion of the one or more data sets.

14. The computer system of claim 13, wherein the visualizer component is configured to convey a similarity measure as computed between two data sets.

15. The computer system of claim 13, wherein the visualizer component is configured to assist in obtaining a command to merge or unmerge two data sets.

* * * * *